UNITED STATES PATENT OFFICE.

JANE SANDERSON, OF CHICAGO, ILLINOIS, ASSIGNOR, BY MESNE ASSIGNMENTS, TO FIBRO DRESS FORM COMPANY, OF CHICAGO, ILLINOIS, A CORPORATION OF SOUTH DAKOTA.

PLASTIC COMPOSITION FOR DRESS-FORM-MOLDING PURPOSES.

1,123,600.     Specification of Letters Patent.     Patented Jan. 5, 1915.

No Drawing.     Application filed December 13, 1913. Serial No. 806,414.

*To all whom it may concern:*

Be it known that I, JANE SANDERSON, a citizen of the United States, and residing at Chicago, in the county of Cook and State of Illinois, have invented certain new and useful Improvements in Plastic Compositions for Dress-Form-Molding Purposes, of which the following is a full, clear, and exact specification, such as will enable others skilled in the art to which it appertains to make and use the same.

This invention relates generally to improvements in a plastic composition, and has reference more particularly to a new and useful composition which is peculiarly adapted for use in forming dress forms simulating the human body.

My invention has for its primary object to provide a composition for this purpose which will produce a sanitary dress form of light weight and artistic appearance, and possessing the qualities of requisite toughness and flexibility. This invention also contemplates the provision of a composition which in this embodiment attains a dress form that is non-breakable and incapable of shrinkage from its original contour and dimension.

In the practical carrying out of my invention I use the following ingredients:— asbestos fiber, ground or finely-pulverized asbestos, plaster, china clay, and liquid glue. These ingredients are commingled together to compose the novel plastic composition, and are preferably mixed in substantially the following proportions: To forty parts of asbestos fiber, and thirty parts of finely-pulverized asbestos, I add twenty parts of calcined plaster, and five parts each of china clay and liquid glue. I prefer that the latter two ingredients should together comprise in the neighborhood of ten per cent. of the total mixture. In practice I have found that the best plaster to use is that kind known as dental plaster, which contains a small percentage of alum, or equivalent salt.

This composition is peculiarly adapted for use in the formation of dress forms made in the simulation of the human body and adapted for purposes of dress fitting, and I apply the same when in plastic condition to a suitable base which may consist solely of a woven jacket fitted on the human body, or to an impregnated jacket already molded to the shape desired, and whether the jackets are fitted to the body in sections or not. For present purposes the composition is spread evenly and easily on the base and quickly adheres thereto, the dental plaster assisting in setting and hardening the compound, while the asbestos and glue acts as a binder of the mass and to some extent retards too rapid setting.

The effect produced gives to the form an appearance of a soft silky luster approximating a creamy tint, which positively overcomes the necessity of affixing other externally applied coverings to the form, which heretofore have been necessarily used with other types of dress forms in an attempt to obtain a natural flesh color, and in order to further impart an artistic and pleasing appearance, which otherwise would not be obtained.

The form thus produced is not only non-breakable and incapable of shrinkage (an important feature in a dress form) but it also possesses an exceptional lightness of weight, which renders it capable of being readily handled and transported, a decided advantage as will readily be understood.

I do not desire to be limited to the exact and precise proportions named, for although I have given above what I have found out in practice to be the best proportions for the plastic compound, yet these may be varied without in any way departing from the spirit and scope of my invention as pointed out in the appended claims.

From the foregoing, the essential features, elements and proportions of the composition, together with its many advantages, will be readily apparent to those skilled in the art to which I have shown to be peculiarly adapted for use.

Having thus described my invention, what I claim as new and desire to secure by Letters Patent, is the following:—

1. The herein described composition of matter for producing a molded dress form simulating the human figure, consisting of an admixture of asbestos, plaster, china clay, and liquid glue, in substantially the proportions specified and for the purposes herein stated.

2. The herein described composition of matter for producing a molded dress form simulating the human figure, consisting of an admixture of ground and shredded asbestos, plaster, china clay, and glue, in substantially the proportions specified and for the purposes herein stated.

In testimony whereof I have hereunto signed my name in the presence of the subscribed witnesses.

JANE SANDERSON.

Witnesses:
W. HERBERT FOWKES,
M. M. MOORE.

Copies of this patent may be obtained for five cents each, by addressing the "Commissioner of Patents, Washington, D. C."